(12) United States Patent
Gouget et al.

(10) Patent No.: US 9,130,739 B2
(45) Date of Patent: Sep. 8, 2015

(54) METHOD AND APPARATUS FOR NONLINEAR IV SETUP IN KEYSTREAM GENERATORS

(75) Inventors: Aline Gouget, Paris (FR); Pascal Paillier, Paris (FR)

(73) Assignee: GEMALTO SA, Meudon (FR)

( * ) Notice: Subject to any disclaimer, the term of this patent is extended or adjusted under 35 U.S.C. 154(b) by 2 days.

(21) Appl. No.: 14/112,635

(22) PCT Filed: Apr. 12, 2012

(86) PCT No.: PCT/EP2012/056606
§ 371 (c)(1),
(2), (4) Date: Oct. 18, 2013

(87) PCT Pub. No.: WO2012/143277
PCT Pub. Date: Oct. 26, 2012

(65) Prior Publication Data
US 2014/0050316 A1   Feb. 20, 2014

(30) Foreign Application Priority Data

Apr. 21, 2011   (EP) .................................... 11305482

(51) Int. Cl.
*H04K 1/04* (2006.01)
*H04K 1/06* (2006.01)
*H04L 9/06* (2006.01)
*H04L 9/00* (2006.01)

(52) U.S. Cl.
CPC ................ *H04L 9/0668* (2013.01); *H04L 9/00* (2013.01)

(58) Field of Classification Search
CPC .......................................... H04L 9/065–9/0668
USPC ........................................................... 380/40
See application file for complete search history.

(56) References Cited

U.S. PATENT DOCUMENTS

2008/0109654 A1* 5/2008 Hardacker et al. ............ 713/162
2011/0091038 A1* 4/2011 Thueringer .................... 380/255

OTHER PUBLICATIONS

W.H. Tan, "Practical Attacks on the MIFARE Classic," Imperial College London Department of Computing, 2009.*
International Search Report (PCT/ISA/210) mailed on May 23, 2012, by the European Patent Office as the International Searching Authority for International Application No. PCT/EP2012/056606.
Written Opinion (PCT/ISA/237) mailed on May 23, 2012, by the European Patent Office as the International Searching Authority for International Application No. PCT/EP2012/056606.
K.E. Mayes et al., The MIFARE Classic Story, Information Security Technical Report 15, Feb. 1, 2010, pp. 8-12.
Wouter Teepe, Making the Best of Mifare Classic, retrieved from Internet: http://www.cs.ru.nl/~wouter/papers/2008-thebest.pdf, Oct. 6, 2008, pp. 1-39.

* cited by examiner

*Primary Examiner* — Dede Zecher
*Assistant Examiner* — Vadim Savenkov
(74) *Attorney, Agent, or Firm* — Buchanan Ingersoll & Rooney PC

(57) ABSTRACT

The invention concerns the contact-less technology MIFARE, and describes a method to update a state by injecting an IV using a non-linear feedback shift register that makes use of only look-up tables and basic operations on 8-bit words.

5 Claims, 1 Drawing Sheet

METHOD AND APPARATUS FOR NONLINEAR IV SETUP IN KEYSTREAM GENERATORS

The invention relates to a method and an apparatus for nonlinear IV setup in keystream generators.

More precisely, the invention describes efficient software implementation of a hardware-oriented stream-cipher The invention concerns the MIFARE contact-less technology, which is used within public transportation networks for ticketing and access management applications.

In the following description, some linear functions will be used. Linear function can be implemented using tables, and tables easily define corresponding linear functions. "Linear function" and "tables" will be used equally.

The main cryptographic building block of MIFARE contact-less technology is a stream cipher called CRYPTO-1. The general structure of CRYPTO-1 can be sketched as follows:

1) A shift register of 48-bit state denoted (at time t>0) by $STt=(st, \ldots, st+47)$, with $si \in \{0, 1\}$, $i \geq 0$.
2) A key-setup Function
3) An IV-setup Function
4) A keystream generation Function The most critical part of the CRYPTO-1 stream cipher with respect to software implementation performances is the IV-setup Function which is a nonlinear function. For the IV-setup phase, the successive nonlinear feedback bits used to update the shift register are computed, for each, as a nonlinear function of the previous state including the previous feedback bits.

Let $STt0=(st0, \ldots, st0+47)$ be the state of the cipher before performing the IV-setup function (we assume that the key-setup function has been already performed). The state $STt0$ will be updated by using a nonlinear Boolean function nlf and a 32-bit $IV=(IV0, \ldots, IV31)$ injected bit per bit into the state as follows:

FOR i=0 to 31 DO $$st0+48+i = nlf(st0+i, \ldots, st0+47+i, IVi)$$

$$STt0+i+1 = (st0+i+1, \ldots, st0+i+48).$$

After the injection of a 32-bit IV into $STt0$, the new state of the cipher is $STt0+32=(st0+32, \ldots, st0+79)$. Now, the cipher is ready to generate keystream, for example to complete the MIFARE contact-less technology authentication protocol.

The function nlf "effectively" depends on only 28 variables (instead of 49). Without loss of generality, any n-variable Boolean function F can be represented using the Algebraic Normal Form by:

$$F(x1, \ldots, xn) = G(x1, \ldots, xn) \text{ xor } L(x1, \ldots, xn),$$

where L is a linear Boolean function and $G(x1, \ldots, xn)$ is a non-linear function. The function nlf falls into a particular class of Boolean functions, i.e. Boolean functions such that:

$G(x1, \ldots, xn) = GU(x1, \ldots, xn-k) \text{ xor } GH(xn-k+1, \ldots, xn)$. $GV(x1, \ldots, xn-k)$ where k is a small integer compared to n.

The function nlf is "bit-oriented". A straightforward implementation of nlf makes use of a large number of bit selections (basically, it can be implemented using a right/left shifts and Byte-AND or Byte-OR). The bit values are next combined using bit-XOR and bit-AND.

One classical solution to turn a bit-oriented implementation into a byte-oriented implementation is to replace bit selections by look-up tables and bit-oriented operations by byte-oriented operations. However, this classical solution cannot be directly applied when the bit-value sj is computed using a non-linear function that non-linearly depends on sj−1 and/or sj−2 and/or . . . and/or sj−8.

The invention describes a method to update a state by injecting an IV using a non-linear feedback shift register that makes use of only look-up tables and basic operations on 8-bit words.

The size of the internal state of the cipher is N=8*n. A typical value for n is n=6 or n=32. At time t, the internal state of the cipher is represented by $STt=(STt[0], \ldots, STt[n-1])$, or equivalently by $STt=(st, \ldots, st+8n-1)$.

We assume that a key setup function has been performed on the state of the cipher (e.g. the key has been loaded into the state) before starting the IV setup phase. We do not make any assumption on the key setup function.

IV setup phase:

Let $STt0=(st0, \ldots, st0+8n-1)$ be the initial state of the cipher for the IV setup phase, where $t0>0$ is a predetermined value. During this phase, the internal state of the cipher is updated using an Initialization Value (IV) of length 8*m bits, m>0 (a typical value for m is m=4, m=8, m=12 or m=16). We denote the IV bytes by: $IV=(IV[0], \ldots, IV[m-1])$.

The final state of the IV setup phase is:

$$STt0+8m=(st0+8m, \ldots, st0+8(m+n)-1)$$

Since the IV setup phase should not be "easy" to invert, i.e. knowing the final state of the IV setup phase, it should not be easy to recover the initial state of the IV setup phase, the function used to update the state during the IV Setup phase is generally chosen to be nonlinear.

Nonlinear Update of the State (NLF).

From the initial state $STt0$, the m successive states $STt0+8$, $STt0+16, \ldots, STt0+8m$ are computed by injecting byte per byte the IV into the state through a non-linear update function called 1-byteNLF.

At time $T=t0, T+1=t0+8, \ldots, T+m-1=t0+8*(m-1)$, the cipher state $STT+i$, $0 \leq i \leq m-1$, is updated using $IV[i]$ by computing one byte-value which is $STT+i+1[n-1]$. Indeed, assuming that at time $T+i$, the state is:

$$STT+i = (STT+i[0], STT+i[1], \ldots, STT+i[n-1])$$

Then, the state at time $T+i+1$ is:

$$STT+i+1 = (STT+i[1], STT+i[2] \ldots, STT+i[n-1],$$
$$STT+i+1[n-1]) = (STT+i+1[0], STT+i+1[1] \ldots,$$
$$STT+i+1[n-2], STT+i+1[n-1])$$

In other words, $STT+i+1[j]=STT+i[j+1]$, for $j=0, \ldots, n-2$, and only one-byte value (i.e. $STT+i+1[n-1]$) needs to be computed. We compute this byte value using a non-linear function called 1-byteNLF.

Function 1-byteNLF. This function makes use of:

1) n look-up tables of size (8 bits)*(8 bits) denoted by LF0, LF1, . . . , LFn−1 (possibly, there exists (i, j), $0 \leq i < j < n$ such that LFi=LFj, and/or there exists i, $0 \leq i < n$, such that LFi=Ø.

2) 2n look-up tables of size (8 bits)*(4 bits) denoted by BFl0, BFr0, BFl1, BFr1, . . . , BFln−1, BFrn−1 (possibly, there exists (i, j), $0 \leq i < j < n$ such that BFxi=BFyj where x, y∈{r, l}, and/or there exists i, $0 \leq i < n$, such that BFxi=Ø where x∈{r, l}). In particular implementations it is possible to use n tables of size (8 bits)*(8 bits). The previous tables sizes speak about useful tables sizes. It stills possible storing a (8 bits)*(4 bits) useful size table, inside a (8 bits)*(8 bits) real size table.

3) Two filtering functions:
Ga: $\{0, 1\}^{\{8*k\}} \to \{0, 1\}^8$;
Gb: $\{0, 1\}^{\{8*k\}} \to \{0, 1\}^8$;
with k such that 0<k n−1. Depending on the implementation, the input values of Ga and Gb are for example k bytes or k/4 32-bit words.

4) One look-up table I0 of size (8 bits)*(8 bits)
The computation of STT+i+1[n−1]=(st+8(n+i−1), ..., st+8(n+i)−1) includes the following steps:
1) Computation of intermediate 1-byte values:
(S[T+i], for some i, 0≤i≤n−1) represents a selection of 8 bits from two bytes of S.

$$Xi=BFli[S[T+i]], \text{ for some } i, 0 \le i \le n-1$$

$$Yi=BFli[S[T+i]], \text{ for some } i, 0 \le i \le n-1$$

2) Computation of two 1-byte values U and V:
U is computed using the function Ga, applied to 4 bytes. Each one of these bytes has been computed using one Xi value, and one Yi value. This can be also described as following:

$$U=Ga(Xil, \ldots, Xik, Yil, \ldots, Yik'), \text{ where } 1 \le k, k' \le 8*n$$

V is computed using the function Gb, applied to 4 bytes. Each one of these bytes has been computed using one Xi value, and one Yi value. This can be also described as following:

$$V=Gb(Xil, \ldots, Xik, Yil, \ldots, Yik'), \text{ where } 1 \le k, k' \le 8*n$$

3) Computation of a temporary value:

$$STT+i+1[n-1]=XORj=0,\ldots,n-1 \ (LFi(STT+i[j]))$$

Advantageously, an additional step is used in order to update the temporary value STT+i+1[n−1] by adding, using the XOR operation, a linear function of one byte of the initialization value IV[i]. This can be also described as follows:

$$STT+i+1[n-1]=STT+i+1[n-1] \ XOR \ I0[IV[i]]$$

4) The current value of STT+i+1[n−1] is next updated bit per bit, as follows. For j=0 to 7, compute:
A temporary byte value e computed from a value BFxj [STT+i+1[n−1]], where x∈{r,1} and for some j, 0≤j≤n−1
A temporary byte value t=(U AND e) XOR V
STT+i+1[n−1]=STT+i+1[n−1] XOR select(j, t), where:
select (j, t) represents the selection of bits at step j which are the bits ij1, ..., ijw, 0≤ijr≤7 with 0≤r≤7, of the byte value t.

More precisely, the invention is a method to perform the "reader challenge setup step in the authentication phase", according to the MIFARE contact-less technology authentication and encryption protocol, in the "tag device", wherein, the size of the internal state of the cipher, called "ST" is 6 bytes, at time t, the internal state of the cipher is represented by $ST_t=(ST_t[0], \ldots, ST_t[5])$, the reader challenge, called "RC" previously denoted by IV, of length 4 bytes, is denoted by: RC=(RC[0], ..., RC[3]), a linear function "LF" performing the linear feedback function of the MIFARE contact-less technology linear feedback shift register, and a non linear function, "NLF", performing the MIFARE contact-less technology two-layer filter generator, are used to update the value of the said ST using the said RC.

The said method comprises at least the following steps:
Arrangement of "ST" bits in byte to store, in one nibble the bits with a pair ranking, and in the other nibble the bits with an impair ranking.
creation of four tables f1i, f1p, f2i, f2p
from the initial state of the said reader challenge setup step denoted by $ST_{t0}$, the successive states $ST_{t0+8}$, $ST_{t0+16}$, $ST_{t0+24}$, $ST_{t0+32}$ are computed by computing byte per byte the linear feedback value using the said function LF injecting byte per byte the said "RC" into the said ST using the said function NLF This method can comprise a preliminary step of arrangement of "ST" bits in byte to store, in one nibble the bits with a pair ranking, and in the other nibble the bits with an impair ranking.

The linear feedback function can be defined using 6 8-bit× 8-bit pre-computed tables $L_0, \ldots, L_5$ such that:

$$LF(ST_{8t+i}[0], \ldots, ST_{8t+i}[5])=L_5[ST_{8t+i}[5]] \oplus L_4[ST_{8t+i}[4]] \oplus \ldots \oplus L_0[ST_{8t+i}[0]]$$

The "NLF" function can be defined by:
A 8 bits size register, called "Buff" which is initialized or updated using the linear function LF applied on ST and table I0 is computed for one byte of RC
Four 8-bit×8-bit pre-computed tables f1i, f1p, f2i, f2p applied on the state ST
one function "Ga", applied on four byte values "a", "b", "c" and "d" and producing a one byte value such as:

$$Ga(a, b, c, d)=(((a\hat{\ }d) \ \& \ (a\hat{\ }b\hat{\ })(b \ \& \ c)))\hat{\ }0xFF\hat{\ }d)$$

one function "Gb", applied on four byte values "a", "b", "c" and "d" and producing a one byte value such as:

$$Gb(a, b, c, d)=((a\hat{\ }(b \ \& \ d)) \ \& \ (c\hat{\ }a)\hat{\ }(a \ \& \ d))$$

one function "G" that uses two bytes values, denoted by U and V, that are the outputs of said functions Ga, Gb, where the input bytes of Ga and Gb are computed using bits from ST and the four tables f1i, f1p, f2i, f2p. Two byte values, denoted by UU and VV are initialized with bits from said ST and possibly with bits from said register Buff. The values of UU and VV are updated using 8 steps before the final update of the said register Buff using the values UU and VV when all bits of said register Buff are computed, the first byte of said ST is trashed, all the other bytes are left shifted, and the register Buff is insert as sixth rank.

Other characteristics and advantages of the present invention will emerge more clearly from a reading of the following description of a number of preferred embodiments of the invention with reference to the corresponding accompanying drawings in which.

Figure 1:
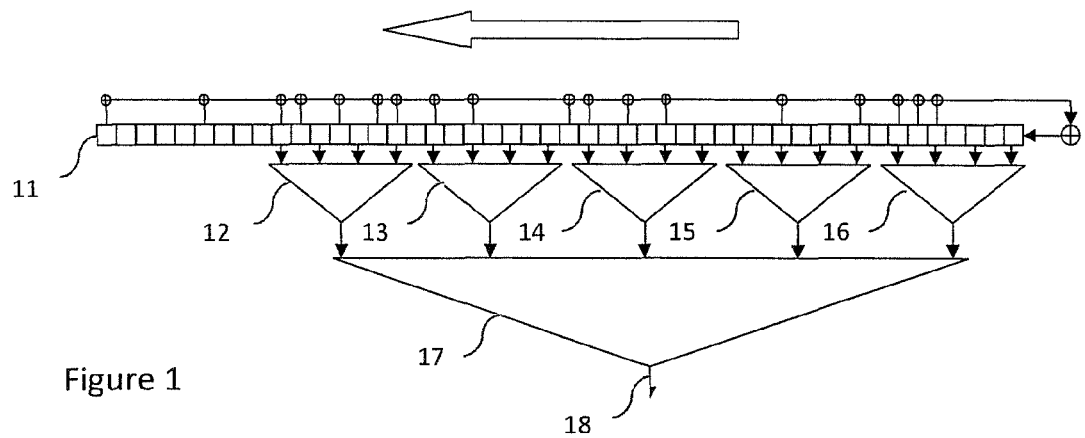
FIG. 1 depicts the traditional operation done according to MIFARE contact-less technology protocol.

FIG. 1 depicts the hardware design of the Cryptol cipher of the contact-less technology Classic chip. The core of the Cryptol cipher is a 48-bit Linear Feedback Shift Register (11). At every clock tick, the feedback bit is computed as a linear combination using the XOR operation of bits of the current state, the register is shifted one bit to the left such that the leftmost bit is discarded and the rightmost bit is the feedback bit. The LFSR state is filtered by a nonlinear Boolean function which is composed by two layers of circuits. The first layer (12,13,14,15,16) makes use of two different circuits corresponding to two different 4-variable Boolean functions f1 and f2. The circuit of the Boolean function f1 is used twice (12 and 15) and the Boolean function f2 is used in the three other places in the first layer (13, 14 and 16). At each clock tick, the first layer outputs 5 bits that are the 5 input bits of the second layer. The second layer (17) is composed by a circuit corresponding to a 5-variable Boolean function (17) and that produces a single output bit (18).

Figure 2:
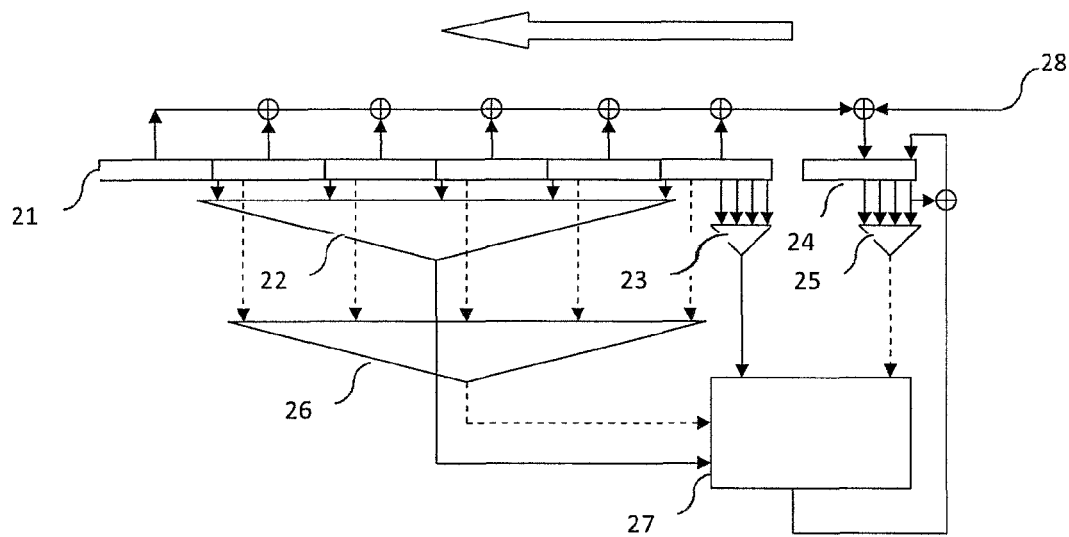
FIG. 2 depicts the implementation of the current invention.

FIG. 2 depicts the software implementation of the current invention. The core of the Cryptol cipher is represented by 6 bytes (21) corresponding to the cipher state at some time T. The linear feedback byte is computed using the 6 (1 byte)*(1 byte) tables denoted by $L_0, L_1, L_2, L_3, L_4$ and $L_5$. The current invention targets the insertion of the reader challenge (28)

sent during an authentication protocol. At time T+1, the cipher state will be obtained by discarding the leftmost byte of (21) and by adding at right the new byte represented by (24).

For each byte of the Reader Challenge (RC), the current invention computes the value of the new byte (24). It is first initialized with the byte-XOR operation between the linear feedback byte and the byte (28) which is a linear function of the byte of the reader challenge computed using a (1byte)*(1 byte) table. Next, the invention computes two bytes values U and V using two functions G1 (21) and G2 (26). The value of the byte (24) is updated using 8 steps. For each of the 8 steps, a 4-variable Boolean function f2 is computed such that input bits are located on the rightmost byte of the current state (21) and/or the next state byte (28). For the first step, the taps are located on the current state as depicted by (23). For the last step, the taps of the 4-variable Boolean function are located on the new state byte as depicted by (24)(25). The computation of f2 is done using either the table f2i or f2p.

The output bit of (23) and (25) is used to update UU and/or VV in a register Buff (27). Finally, UU and VV are used for final update of (24).

The invention claimed is:

1. A method to perform a "reader challenge setup step in an authentication phase", according to MIFARE contact-less technology authentication and encryption protocol, in a "tag device", wherein, a size of an internal state of a cipher, called "ST" is 6 bytes, at time t, the internal state of the cipher is represented by $ST_t=(ST_t[0], \ldots, ST_t[5])$, a reader challenge, called "RC", of length 4 bytes, is denoted by: RC=(RC[0], RC[3]) a linear function "LF" performing a linear feedback function of a MIFARE contact-less technology linear feedback shift register, and a non linear function, "NLF", performing a MIFARE contact-less technology two-layer filter generator, are used to update a value of said ST using the RC, wherein the method comprises at least the following steps:

storing, in a memory of said tag device, four tables f1i, f1p, f2i, f2p;

from an initial state of the reader challenge setup step denoted by $ST_{t0}$, computing by a processor of said tag device, the successive states $ST_{t0+8}$, $ST_{t0+16}$, $ST_{t0+24}$, $ST_{t0+32}$ by computing byte per byte a linear feedback value using the function LF; and injecting, by said tag device, byte per byte the "RC" into the ST using said four tables f1i, f1p, f2i, f2p and the function NLF.

2. The method according to claim 1 wherein said method comprises a preliminary step of arrangement of "ST" bits in byte to store, in one nibble the bits with a pair ranking, and in the other nibble the bits with an impair ranking.

3. The method according to claim 1 wherein, said linear feedback function is defined using 6 8-bit×8-bit pre-computed tables $L_0, \ldots, L_5$ such that:

$$LF(ST_{8t+i}[0], \ldots, ST_{8t+i}[5])=L_5[ST_{8t+i}[5]] \oplus L_4[ST_{8t+i}[4]] \oplus \ldots \oplus L_0[ST_{8t+i}[0]].$$

4. The method according to claim 3 wherein, said "NLF" function is defined by:

an 8-bit size register, called "Buff" which is initialized or updated using the linear function LF applied on ST and one byte of RC the four tables f1i, f1p, f2i, f2p, which are 8-bit ×8-bit pre-computed tables, are applied on the state ST one function "Ga", applied on four byte values "a", "b", "c" and "d" and producing a one byte value:

$$Ga(a, b, c, d)=(((a\hat{}d) \& (a\hat{}b\hat{})(b \& c)))\hat{}0xFF\hat{}d)$$

one function "Gb", applied on four byte values "a", "b", "c" and "d" and producing a one byte value such as:

$$Gb(a, b, c, d)=((a\hat{}(b \& d)) \& (c\hat{}a)\hat{}(a \& d))$$

one function "G" that receive the outputs of said functions Ga, Gb and two byte values, denoted by U and V that are initialized with bits from said ST, two byte values, denoted by UU and VV that are initialized with bits from said ST and possibly with bits from said Buff, these values UU and VV are updated using 8 steps before the final update of the register Buff and the register Buff when all bits of said register Buff are computed, the first byte of said ST is trashed, all the other bytes are left shifted, and the register Buff is insert as sixth rank.

5. The method according to claim 4 wherein, said register "Buff" contains the current byte of the RC to compute, xored with the byte provided by said linear function "LF".

* * * * *